United States Patent [19]
Muirhead

[11] Patent Number: 4,911,493
[45] Date of Patent: Mar. 27, 1990

[54] PICKUP TRUCK BED SEAT LINER INSERT

[76] Inventor: Scott A. W. Muirhead, 276 Centennial Parkway, Delta, British Columbia, Canada, V4L1KS

[21] Appl. No.: 122,786

[22] Filed: Nov. 19, 1987

[51] Int. Cl.[4] .......................... B60N 1/10; B62D 33/02
[52] U.S. Cl. .................................. 296/39.2; 296/37.6; 296/66; 297/191
[58] Field of Search .................... 296/39 R, 10, 64, 66, 296/37.6, 37.16; 410/94, 101; 297/DIG. 2, 191; D12/98, 156, 157

[56] References Cited

U.S. PATENT DOCUMENTS

| | | | |
|---|---|---|---|
| D. 271,009 | 10/1983 | Fishler | 296/39 R X |
| 1,855,665 | 4/1932 | Campbell et al. | 410/94 |
| 2,414,730 | 1/1947 | Flogaus | 296/64 |
| 3,413,031 | 11/1968 | Gafvert et al. | 296/63 |
| 3,829,151 | 8/1974 | Fellenstein | 296/64 |
| 3,840,263 | 10/1974 | Bowden | 296/10 |
| 3,857,601 | 12/1974 | Robbins | 296/10 |
| 3,881,768 | 5/1975 | Nix | 296/39 R |
| 3,984,140 | 10/1976 | Robertson | 296/24 R X |
| 4,003,596 | 1/1977 | Robertson | 296/69 X |
| 4,005,589 | 2/1977 | Way | 296/69 X |
| 4,111,481 | 9/1978 | Nix et al. | 296/39 R |
| 4,161,335 | 7/1979 | Nix et al. | 296/39 R |
| 4,181,349 | 1/1980 | Nix et al. | 296/39 R |
| 4,336,963 | 6/1982 | Nix et al. | 296/39 R |
| 4,341,412 | 7/1982 | Wayne | 296/39 R |
| 4,540,214 | 9/1985 | Wagner | 296/39 R |
| 4,558,979 | 12/1985 | Andrews | 410/101 |
| 4,572,568 | 2/1986 | Kapp et al. | 296/39 R |
| 4,575,146 | 3/1986 | Markos | 296/39 R |
| 4,595,229 | 6/1986 | Wagner | 296/39 R |
| 4,623,187 | 11/1986 | Ibrahim | 296/39 R |
| 4,679,840 | 7/1987 | Fry et al. | 296/64 |

FOREIGN PATENT DOCUMENTS

| | | | |
|---|---|---|---|
| 858419 | 12/1970 | Canada . | |
| 1246867 | 10/1960 | France . | |
| 298626 | 11/1928 | United Kingdom | 296/37.16 |

*Primary Examiner*—Dennis H. Pedder
*Attorney, Agent, or Firm*—Howard A. Kenyon

[57] ABSTRACT

An assembly for installation in the cargo compartment of a light pickup truck consisting of a unitarily formed inner cargo liner insert and rear facing seat combination is described. The seat back of the rear facing seat is hinged at the top and locked at the bottom to provide a secure storage compartment. The liner in one embodiment allows a camper shell to be placed on the top of the sidewall and frontwall of the cargo compartment. In another embodiment, the liner has a watertight seal around the perimeter of the carbo compartment. The rear facing seat also includes two armrests that are designed to cover the two wheelwells. Two anchored seatbelts are also provided to ensure safety when passengers are riding in the rear facing seat.

18 Claims, 2 Drawing Sheets

PICKUP TRUCK BED SEAT LINER INSERT

BACKGROUND OF THE INVENTION

1. Field of the Invention

This invention is generally directed to a liner insert for a pickup truck and more particularly to a liner insert unitarily formed with a rearward facing seat, a cargo compartment and a storage compartment under the seat back.

2. Description of the Prior Art

The dramatic growth of pickup truck vehicle sales as well as the extension of the pickup from a traditional utility truck to a recreational and basic transportation vehicle, has contributed to the need for a pickup truck bed insert which both protects the truck bed from damage and provides seating for passengers unable to be accommodated within the vehicle cabin. There are several prior art patents covering similar pickup truck protective liner barriers. Some of these are U.S. Pat. No. 3,814,473 to Lorenzen, U.S. Pat. No. 3,881,768 to Nix, U.S. Pat. No. 4,111,481 to Nix et al, U.S. Pat. No. 4,333,678 to Nix, U.S. Pat. No. 4,111,481 to Nix et al, U.S. Pat. No. 4,333,678 to Munuz et al, U.S. Pat. No. 4,336,963 to Nix et al, U.S. Pat. No. 4,575,146 to Markos, U.S. Pat. No. 4,540,214 to Wagner, U.S. Pat. No. 4,572,568 to Kapp et al, U.S. Pat. No. 4,592,583 to Dresen et al. Although these prior art patents have been proposed as protective truck bed liner barriers, they have not been adapted to provide safe seating for outboard truck bed passengers.

Other prior art patents are U.S. Pat. No. 3,469,355 to McGann, U.S. Pat. No. 3,829,151 to Fillenstein, U.S. Pat. No. 3,840,263 to Bowden, U.S. Pat. No. 3,984,140 and 4,003,596 to Robertson, U.S. Pat. No. 4,005,898 to Way, U.S. Pat. No. 4,623,187 to Ibrahim provides some seating but without a safe passenger seating means, a cargo compartment in the truck bed and a storage compartment behind the seat back. For example, U.S. Pat. No. 4,623,187 to Ibrahim shows two passenger seats, both facing forward and no seat belts. In case of a serious crash by the pickup truck, the passengers would be catapulted through the air with a high probability of being fatally injured. What is needed is a truck bed liner insert formed in a unitary manner to provide both a truck bed cargo compartment in combination with safe rear facing passenger seating and a secure storage compartment behind the seat back.

SUMMARY OF THE INVENTION

It is the primary object of this invention to provide a unitarily formed pickup truck liner insert.

It is another object of this invention to provide a unitarily formed pickup truck liner insert that contains a rearward facing passenger seat.

It is a further object of this invention to provide a unitarily formed pickup truck liner having a rearward facing passenger seat that has a secure storage compartment behind the passenger seat back.

It is yet another object of this invention to provide at least one seat belt installed in the rearward facing passenger seat.

It is still another object of this invention to provide a cargo compartment in the truck bed with a constraint to keep the cargo in a confined space.

Briefly, in accordance with this invention, there is provided a unitarily formed liner insert for installation in the cargo compartment of a light pickup truck consisting of cargo compartment in the truck bed and a rear facing passenger seat. The rear facing passenger seat which is directly behind the truck cab contains a storage compartment behind the seat back, the seat back being hinged at the top and latched and locked at the bottom to provide a secure area. The cargo compartment in the truck bed which is between the passenger seat and the tailgate contains a cargo restraint rib around the perimeter of the cargo compartment. This restraint rib restricts the cargo from shifting onto the passengers.

Other objects and advantages will become apparent from the following description and appended claims taken in conjunction with the accompanying drawings.

DETAILED DESCRIPTION OF THE INVENTION

Figure 1:
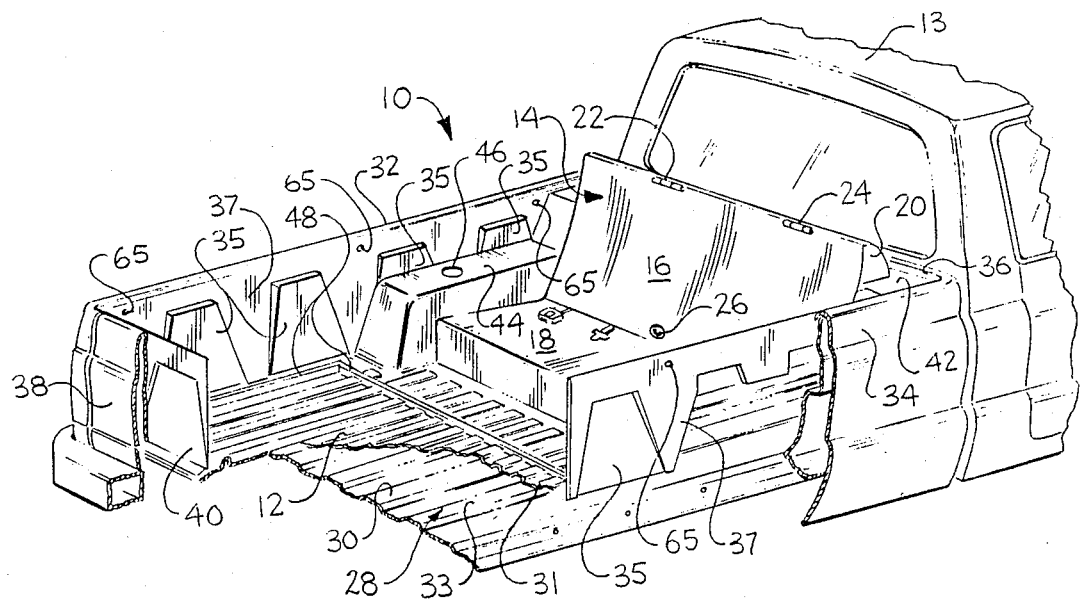
FIG. 1 is a perspective view of a pickup truck cargo compartment partly in section showing the truck bed cargo liner and passenger seat insert.

Referring now to FIG. 1, there is seen a perspective view of a Oickup truck 10 partially in section showing the pickup truck cargo compartment containing a liner insert having a rearward facing passenger seat formed therein. The cargo compartment liner 12 and rearward facing passenger seat 14 are formed unitarily. The rearward facing passenger seat 14 located at the rear of the truck cab 13 is composed of seat back 16, a seat bottom 18, and a head rest 20. After unitarily forming the entire insert, including the passenger seat, the seat back 16 is cut free of the formed cargo compartment liner 12 and two hinges 22 and 24 secure the top of the backrest 16 to the headrest member 20. A latching and locking mechanism 26 is fitted and secured to the bottom portion of the back rest 16. The opening behind seat back 16 provides a secure storage area which can be locked to store valuables while the pickup truck is left unattended. The pickup truck cargo compartment 28 consists of a bed 30, two opposing sidewalls 32 and 34, a frontwall 36 having a top ledge, two opposing wheel wells (not shown), and a tailgate 38 pivotally mounted to the rear of the cargo compartment bed 30. The truck bed insert 10 is adapted to fill the entire pickup truck cargo compartment 28. A unitarily formed tailgate liner 40 is provided to completely line the tailgate 38 and is secured to the interior of the tailgate 38 by suitable fastening means. The tailgate liner 40 contains a plurality of ridges (shown in FIG. 2).

The cargo compartment liner 12, rearward passenger seat 14 and tailgate liner 40 are formed from an impact resistant thermoformable or thermosetting plastic material.

Behind and on each side of the head rest portion 20 of the rearward facing passenger seat 14 is a trough structure 42 around the perimeter of the headrest 20 that provides a means of fastening the front portion of the liner insert to the truck cargo compartment frontwall 36. The fastening means 65 can be seen clearly in FIG. 2.

The rearward facing passenger seat 14 contains extended armrest 44 which encloses the cargo compartment wheel wells. The extended armrests 44 also contain a holder 46 where a passenger may place a drink or the like to prevent spillage.

The cargo compartment liner insert 12 has a cargo restraint member 48 around the periphery of the cargo area to prevent the cargo from sliding into the passenger area and in general hold the cargo in place. The cargo restraint member 48 is a vertical member of sufficient height to prevent the cargo from being forced on the passenger's feet when braking. The cargo carrying section also contains a plurality of longitudinal and equally spaced ridges 31 that provide strength, vertical plane stability and ventilation between the truck bed reinforcing ribs 33 and cargo area insert 12.

FIG. 1 also shows a plurality of molded embosses 35 which are disposed along the opposing sidewalls in the cargo carrying area and above the armrests. The molded embosses act as cargo impact absorbers and increase the dimensional stability of longitudinal and vertical planar surfaces of the opposing sidewall's cargo insert portion 37. The molded embosses also allow the optional use of cargo tie-down devices by providing a gap between the truck bed sidewall 34 and the sidewall line 37 to allow utilizing the fastening means of tie down device 64.

Figure 2:
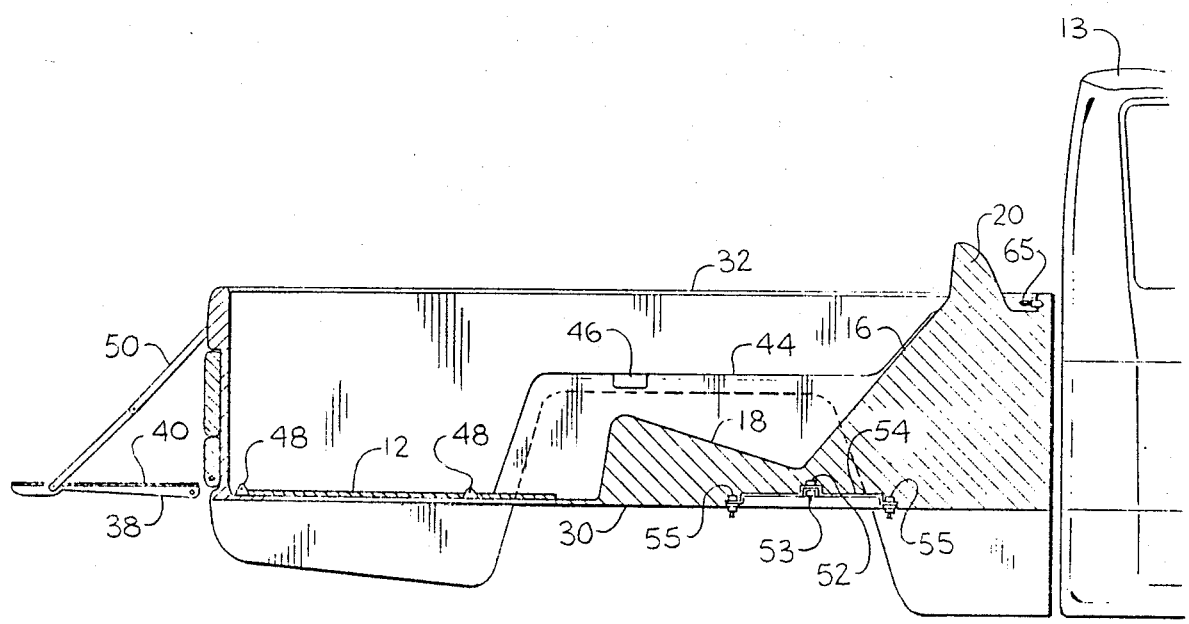
FIG. 2 is a horizontal partial section view of the pickup truck and cargo compartment, the truck cargo linear insert, the rearward facing passenger seat, the seat belt anchor and the tailgate including the tailgate liner.

Turning now to FIG. 2, there is seen a partial section view longitudinally along the pickup truck from the cab 13 to the tailgate 38. The aft facing passenger seat is indicated by headrest 20, backrest 16 and seat bottom 18. The armrests 44 located on each side seat bottom 18 are also shown with holders 46 for drinks or the like. The cargo area insert portion 12 can also be seen with the fore and aft cargo restraint members 48. A cross section view of the tailgate insert 40 secured to tailgate 38 by fastening means is also shown in FIG. 2. In this view the tailgate restraining member 50 is seen with the tailgate 38 in it's down position. FIG. 2 also shows the seatbelt anchor bar 52 that is secured to the anchor bar support frame 54 which is fastened to the truck bed 30.

Figure 3:
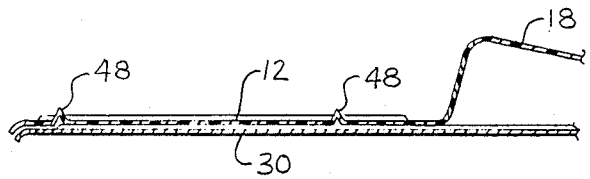
FIG. 3 is a section view taken longitudinally of the rear cargo section and the bottom portion of the passenger seat.

FIG. 3 is a longitudinal cross section view of the cargo area insert 12 which is located between the junction of the seat bottom 18 and the cargo compartment bed 30 and the aft end of the cargo compartment bed 30. The fore and aft cargo restraint member 48 is also shown. It can be seen in this view that the insert 12 lays flat against pickup truck bed 30.

Figure 4:
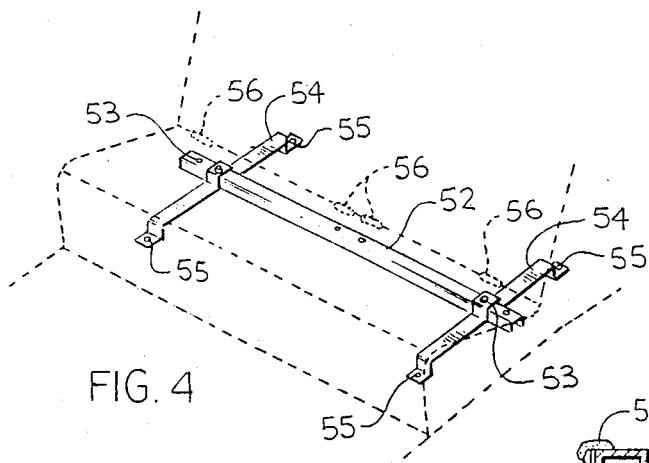
FIG. 4 is a perspective view showing the seat belt anchorage frame.

FIG. 4 shows a seat belt anchor frame 51 containing the seatbelt anchor bar 52, the anchor bar fastening means 53, and the anchor bar support frame 54 is fastened to truck bed 30 by fasteners 55. Also shown in phantom are the slots 56 in the seat bottom 18 where the seatbelts (not shown) pass through.

Figure 5:
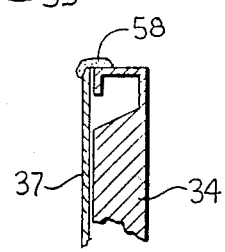
FIG. 5 is a cross section view of the insert liner and the sidewall of the cargo compartment showing the top of the insert liner even with the top of the sidewall with a flat seal covering the joint.

Turning now to FIG. 5, there is seen a partial section of the cargo compartment sidewall 34 and the sidewall insert liner 37. A flat seal 58 provides a weatherproof joint between sidewall 34 and sidewall liner 37. The embodiment in FIG. 5 allows a camper shell to be placed on the truck without any interference from the liner.

Figure 6:
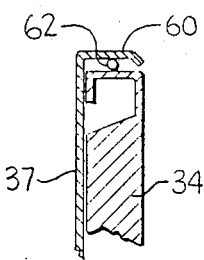
FIG. 6 is a cross section view of the insert liner and the sidewall of the cargo compartment showing the top of the insert liner overlapping the sidewall with sealing means under the overlap.

FIG. 6 shows another embodiment where the sidewall liner insert 37 bends over the top of the cargo compartment sidewall 34. A round seal 60 provides a weathertight joint when compressed.

Figure 7:
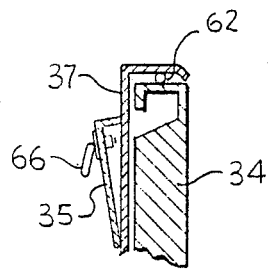
FIG. 7 is a cross section view of the insert liner and the sidewall of the cargo compartment showing the top of the insert liner overlapping the sidewall and a cargo tie-down hook bolted to an embossment in the insert liner.

FIG. 7 shows yet another embodiment where a tie-down device 64 is shown installed in one of the embosses 35 as shown in FIG. 1. As previously indicated, a round seal 62 is installed between cargo compartment sidewall 34 and the sidewall insert liner 37. These seals provide a weathertight insert to prevent water and debris from collecting between the sidewall 34 and the liner 37 and cause corrosion.

Figure 8:
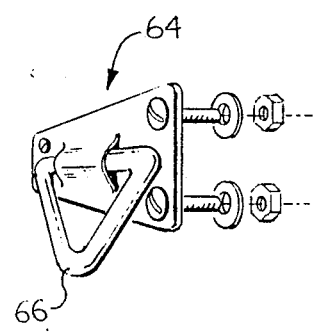
FIG. 8 shows a perspective view of a cargo tie-down device.

FIG. 8 shows a tie-down device 64 with a tie down ring 66 that can be placed in an emboss 35 as shown in FIG. 7. Installation of truck bed liner 10 is relatively easy and when the liner 10 is in position, a plurality of self-taping screws 65 as shown in FIGS. 1 and 2 are used to fasten the liner 37 to the sidewall 32 and 34 and frontwall 36. To prevent the truck bed seat liner insert 10 from cracking as a result of stress caused by the expansion and contraction of the insert material, longitudinally and horizontally oriented slotted holes (not shown) can be pre-drilled in the locations where the self-tapping screws 65 are to be driven into the cargo compartment sidewalls 32 and 34 and frontwall 36.

Accordingly, there has been provided, in accordance with the invention, a pickup truck bed liner and rearward facing seat that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to included all such alternatives, modifications, and variations that fall within the spirit and scope of the appended claims.

What is claimed is:

1. A liner assembly for a pickup truck cargo compartment, said pickup truck cargo compartment having a bed, opposing sidewalls, a front wall, each sidewall and front wall having a top ledge, a tailgate, hinged at the bottom with restraining means on each side, and two wheel wells, said liner assembly comprising:

a one piece liner insert;

a rearward facing passenger seat formed as an integral part of said liner insert, said rearward facing passenger seat having a seat back, a seat bottom, a headrest formed as the upper part of said seat back, an armrest located on each side of said seat bottom, said armrests also enclosing said wheelwells;

a trough structure located between said headrest and said front wall and said sidewall, formed as an integral part of said liner insert, said trough structure providing means for fastening said liner insert to said front wall;

a floor portion formed as an integral part of said liner insert, said floor portion located between said pickup truck cargo compartment sidewalls and between said tailgate and said seat;

sidewall portions formed as an integral part of said liner insert, said sidewall portions of said liner insert being contiguous to said pickup truck cargo compartment sidewalls, the portion of said sidewalls of said liner insert located above said floor portion of said liner insert and the portion of said sidewalls of said liner insert located above said armrests contain raised molded embosses;

a tailgate portion of said cargo compartment liner assembly;

a seatbelt anchor frame with a seatbelt anchor bar extending across said truck bed perpendicular to said truck sidewalls, said anchor bar fastened to an anchor bar support frame on each end of said anchor bar by fastening means, each of said anchor bar support frames fastened at each end to said truck bed by fastening means, said anchor bar having at least one seatbelt connected thereto, said seatbelt protruding through slots in said seat bottom of said rearward facing passenger seat.

2. A liner assembly for a pickup truck cargo compartment as described in claim 1 wherein said floor portion of said liner insert contains a plurality of equally spaced ridges, said ridges being parallel to said cargo compartment sidewalls.

3. A liner assembly for a pickup truck cargo compartment as described in claim 1 wherein said floor portion of said liner insert contains a raised cargo restraint rib around the perimeter of said floor portion, said raised cargo restraint rib being defined by a forward restraint rib, two side restraint ribs and an aft restraint rib.

4. A liner assembly for a pickup truck cargo compartment as described in claim 1 wherein said sidewall portion of said cargo compartment liner insert rearwardly of said armrests and above said armrests terminates at said top ledge of said truck cargo compartment sidewalls.

5. A liner assembly as described in claim 4 wherein said sidewall portion of said cargo compartment liner insert which terminates at the top ledge of said sidewalls is sealed with a weather proof gasket.

6. A liner assembly for a pickup truck cargo compartment as described in claim 1 wherein said sidewall portion of said cargo compartment liner insert rearwardly of said armrests and above said armrests is bent over said top ledge of said cargo compartment sidewalls and terminates in an edge at the outer portion of said left of said cargo compartment sidewalls.

7. A liner assembly is described in claim 6 wherein said sidewall portion which is bent over the top ledge of said cargo compartment sidewalls is sealed with a weather tight seal between the bent over portion of said sidewalls and the top ledge of said cargo compartment sidewalls.

8. A liner assembly for a pickup truck cargo compartment as described in claim 1 wherein said trough structure located between said headrest and said front wall and said sidewall is fastened by fastening means to the inside edge of the top ledge of said cargo compartment front wall.

9. A liner assembly for a pickup truck cargo compartment as described in claim 1 wherein said cargo compartment liner insert is sealed to the top ledge of said cargo compartment sidewall, and secured to inside edge of said cargo compartment front wall by fastening means.

10. A liner assembly for a pickup truck cargo compartment as described in claim 1 wherein said tailgate liner is adapted to be securely fastened to said tailgate.

11. A liner assembly as described in claim 10 wherein said tailgate liner contains a plurality of ridges.

12. A liner assembly for a pickup truck cargo compartment as described in claim 1 wherein the seat back of said rearward facing passenger seat in said cargo compartment is hinged at the top, said seat back having the capability of rotating upward to provide an area for storage behind said seat back.

13. A liner assembly as described in claim 12 wherein said seat back contains latching and locking means at the seat back base.

14. A liner assembly for a pickup truck cargo compartment as described in claim 1 wherein said raised molded embosses provide a base for the installation of a cargo tie-down device, said cargo tie-down device fastened to said raised molded embosses by fastening means.

15. A liner assembly for a pickup truck cargo compartment as described in claim 1 wherein said armrests contain holders for drinks or the like.

16. A liner assembly for a pickup truck cargo compartment as described in claim 1 wherein said one-piece liner insert is formed from an impact resistant plastic material.

17. A liner assembly for a pickup truck cargo compartment, said cargo compartment having a bed, opposing sidewalls, a front wall, each sidewall and front wall having a top ledge; a tailgate hinged at the bottom with restraining means on each side, and two wheel wells, said liner assembly comprising:

a one piece liner insert formed from an impact resistant plastic material;

a rearward facing passenger seat formed as an integral part of said liner insert, said seat adapted to be inserted in said truck cargo compartment, said rearward facing seat having a seat back hinged at the top, said seat back having the capability of rotating upward to provide an area for storage behind said seat back; said seat back having latching and locking means, said seat back having a headrest formed as the upper part of said seat back, said rearward facing passenger seat also having an armrest located on each side of said seat bottom, said armrests enclosing said wheelwells, said armrests containing a holder for drinks or the like;

a trough structure, located between said headrest and said front wall and said sidewalls, formed as an integral part of said liner insert, said trough structure located to the rear and on opposite ends of said headrest, said trough structure providing means for fastening said liner insert to said front wall, said trough structure being fastened by fastening means to an inside edge of the top ledge of said cargo compartment front wall.

a floor portion of said cargo compartment liner insert, said floor portion located between said pickup truck cargo compartment sidewalls and between said tailgate and said seat, said floor portion containing a plurality of equally spaced ridges, said ridges being parallel to said cargo compartment sidewalls; said floor portion containing a raised cargo restraint rib adjacent the perimeter of said floor portion, said cargo restraint rib being defined by a forward restraint rib, two side restraint ribs and an aft restraint rib, said restraint ribs being higher than said ridges and said adjoining ribs being perpendicular to each other;

sidewall portions of said cargo compartment liner insert, said sidewall portions of said cargo compartment liner insert being adjacent to said cargo compartment sidewalls, the portion of said sidewalls of said cargo compartment liner located above said armrests and that portion rearwardly of said armrests contain raised molded embosses, said embosses providing a base for the installation of a cargo tie down device, said cargo tie down device fastened to said raised embosses by fastening means; said sidewall portion of said cargo compartment liner rearwardly of said armrests and said sidewall portion of said cargo compartment liner above said armrests terminate at said top ledge of said sidewall portion of said cargo compartment liner, said sidewalls are sealed at the top edge by a waterproof gasket;

a tailgate portion of said cargo compartment liner assembly, said tailgate liner adapted to be securely fastened to said tailgate; said tailgate liner containing a plurality of ridges that extend across said tailgate;

a seatbelt anchor frame with a seatbelt anchor bar extending across said truck bed perpendicular to said truck sidewalls, said anchor bar fastened to an anchor bar support frame on each end of said anchor bar by fastening means, each of said anchor bar support frames fastened at each end to said truck bed by fastening means, said anchor bar being adapted to have at least one seatbelt connected thereto, said seatbelts protruding trough slots in said seat bottom of said rearward facing passenger seat.

18. A liner assembly for a pickup truck cargo compartment as described in claim 17 wherein said side wall portion of said cargo compartment liner above and rearwardly of said armrests is bent over said top ledge of said cargo compartment sidewalls and terminates in an edge at the outer portion of said ledge of said cargo compartment sidewalls, said sidewall portion which is bent over the top ledge of said cargo compartment sidewalls is sealed with a weather tight seal between the bent over portion of said sidewall and the top ledge of said cargo compartment sidewalls.

* * * * *